(12) United States Patent
Firsich

(10) Patent No.: US 6,479,030 B1
(45) Date of Patent: Nov. 12, 2002

(54) CARBON ELECTRODE MATERIAL

(75) Inventor: David W. Firsich, Dayton, OH (US)

(73) Assignee: Inorganic Specialists, Inc., Miamisburg, OH (US)

( * ) Notice: Subject to any disclaimer, the term of this patent is extended or adjusted under 35 U.S.C. 154(b) by 0 days.

(21) Appl. No.: 09/434,785

(22) Filed: Nov. 5, 1999

Related U.S. Application Data

(63) Continuation-in-part of application No. 08/931,466, filed on Sep. 16, 1997, now Pat. No. 5,993,996.

(51) Int. Cl.$^7$ ................................................. D01F 9/12
(52) U.S. Cl. ............................... 423/447.1; 423/447.7; 423/460
(58) Field of Search ............................... 423/460, 447 J, 423/445 R, 445 B, 447.7, 447.8; 427/215

(56) References Cited

U.S. PATENT DOCUMENTS

| | | | |
|---|---|---|---|
| 3,767,592 A | 10/1973 | Kwok | |
| 3,885,007 A | 5/1975 | Olsen et al. | |
| 4,091,083 A | 5/1978 | Hirschvogel et al. | 423/415.1 |
| 4,327,400 A | 4/1982 | Muranaka et al. | 361/433 |
| 4,565,649 A | 1/1986 | Vogel | 252/503 |
| 4,597,028 A | 6/1986 | Yoshida et al. | 361/305 |
| 4,632,775 A | 12/1986 | Kalnin et al. | 252/502 |
| 4,633,372 A | 12/1986 | Calahan et al. | 361/433 |
| 4,634,546 A | 1/1987 | Kalnin et al. | 252/506 |
| 4,663,230 A | 5/1987 | Tennent | 428/367 |
| 4,775,655 A | 10/1988 | Edwards et al. | 502/416 |
| 4,806,290 A | 2/1989 | Hopper et al. | 264/28 |
| 4,832,881 A | 5/1989 | Arnold, Jr. et al. | 264/29.7 |
| 4,873,071 A | 10/1989 | Yamada et al. | 423/448 |
| 4,921,826 A | 5/1990 | Juntgen et al. | 502/180 |
| 5,021,462 A | 6/1991 | Elmes et al. | 521/63 |
| 5,150,283 A | 9/1992 | Yoshida et al. | 361/502 |
| 5,165,909 A | 11/1992 | Tennent et al. | 423/447.3 |
| 5,171,560 A | 12/1992 | Tennent | 423/447.3 |
| 5,208,003 A | 5/1993 | Simandl et al. | 423/445 |
| 5,260,855 A | 11/1993 | Kaschmitter et al. | 361/502 |
| 5,346,683 A | 9/1994 | Green et al. | 423/447.2 |
| 5,352,339 A | 10/1994 | Kozawa et al. | 205/542 |
| 5,457,343 A | 10/1995 | Ajayan et al. | 257/734 |
| 5,482,601 A | 1/1996 | Ohshima et al. | 204/173 |
| 5,500,200 A | 3/1996 | Mandeville et al. | 423/447.3 |
| 5,543,378 A | 8/1996 | Wang | 502/174 |
| 5,575,845 A | 11/1996 | Belmont et al. | 106/712 |
| 5,589,152 A | 12/1996 | Tennent et al. | 423/447.3 |
| 5,650,370 A | 7/1997 | Tennent et al. | 502/174 |
| 5,706,165 A | 1/1998 | Saito et al. | 361/502 |
| 5,726,524 A | 3/1998 | Debe | 313/309 |
| 5,866,434 A * | 2/1999 | Massey et al. | 436/526 |
| 5,877,110 A | 3/1999 | Snyder et al. | 502/180 |
| 5,916,642 A | 6/1999 | Chang | 427/580 |
| 5,965,267 A | 10/1999 | Nolan et al. | 428/408 |
| 6,031,711 A | 2/2000 | Tennent et al. | 361/303 |

FOREIGN PATENT DOCUMENTS

| | | | |
|---|---|---|---|
| EP | 0198558 B1 | 10/1986 | |
| JP | 5222157 | 12/1983 | C09C/1/56 |

OTHER PUBLICATIONS

"Chamically Modified Carbon Fibers and Their Applications," I.N. Ermolenko, et al., pp. 157–158, 257–259, 272.

\* cited by examiner

*Primary Examiner*—Stuart L. Hendrickson
(74) *Attorney, Agent, or Firm*—Thompson Hine LLP

(57) ABSTRACT

Sulfonated carbon fibrils, method for preparing the sulfonated carbon fibrils, and electrodes prepared from the sulfonated carbon fibrils for use in supercapacitors or other energy storage devices are disclosed.

7 Claims, 1 Drawing Sheet

Figure 1. Electrochemical Impedance data at 0V bias in 6M $H_2SO_4$
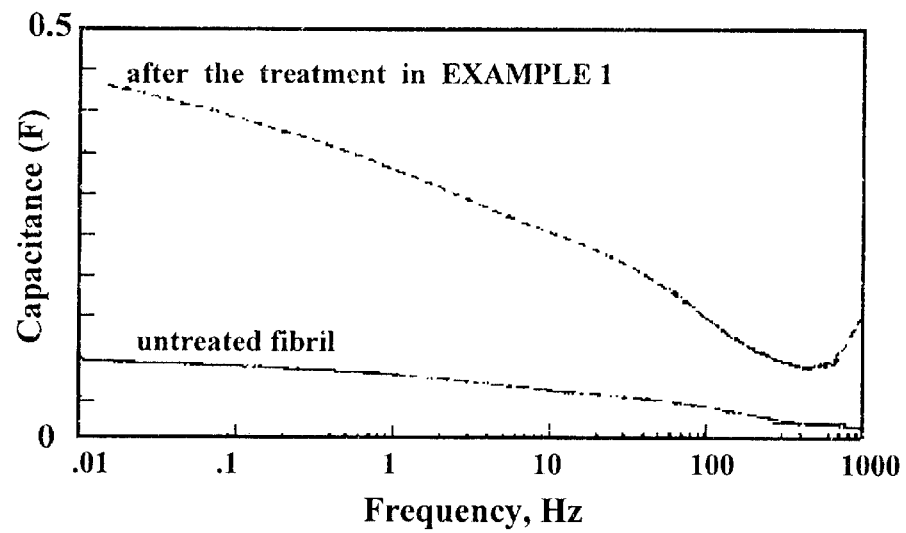
Figure 2. Electrochemical Impedance data at 0V bias in 7M KOH
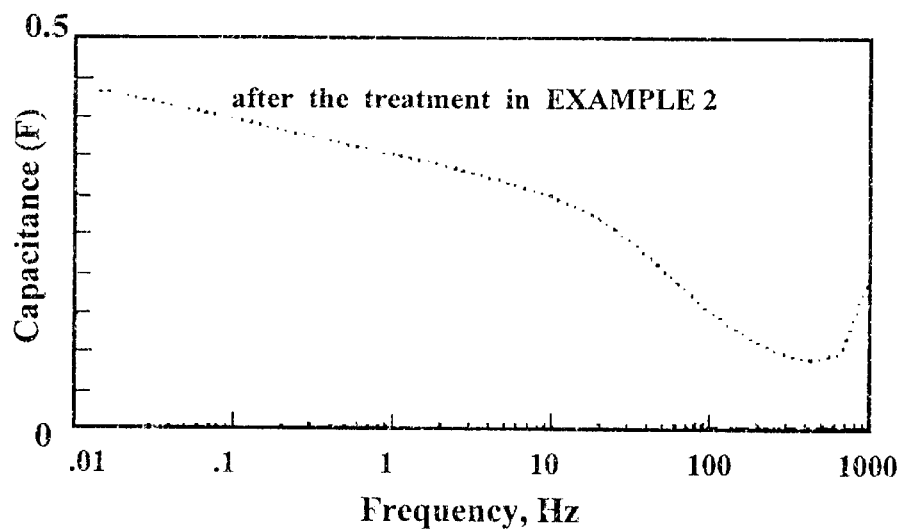

CARBON ELECTRODE MATERIAL

This is a continuation-in-part of application Ser. No. 08/931,466, filed Sep. 16, 1997, now U.S. Pat. No. 5,993,996.

BACKGROUND

This invention pertains generally to energy storage devices, particularly high specific power and high energy density electrochemical capacitors known as supercapacitors, and specifically to a method of making active materials or electrodes for the same. There is a need for a rechargeable energy source that can provide high power, can be recharged quickly, has a high cycle life and is environmentally benign for a myriad of applications including defense, consumer goods, and electric vehicles. Double layer capacitors are rechargeable charge storage devices that fulfill this need.

A single-cell double layer capacitor consists of two electrodes which store charge (these are called the "active" materials), separated by a permeable membrane which permits ionic but not electronic conductivity. Each electrode is also in contact with a current collector which provides an electrical path to the external environment. The electrodes and the membrane are infused with an electrolyte, and the entire assembly is contained in inert packaging. Multiple cells may be connected in series or in parallel in the final packaged unit.

Applying an electric potential across the electrodes causes charge to build up in the double layer which exists at the electrode/electrolyte interface of each electrode. This process can continue until a condition of equilibrium has been reached, i.e., the current drops to zero. The capacitance, or amount of charge that a capacitor can store, is directly related to the surface area of the electrodes. Therefore, electrodes made from conductive materials that possess high surface area (>100 $m^2$/g) are desirable. Devices incorporating such electrodes are often referred to as "double-layer capacitors" or "supercapacitors". By employing various materials and fabrication means, supercapacitors have been developed which are capable of delivering very high specific power and energy densities. Because carbon is chemically inert, has a high electronic conductivity, is environmentally benign and is relatively inexpensive, it is a desirable material for fabricating electrodes for supercapacitors.

Supercapacitor electrode materials may store charge as a consequence of their high surface area. They may also store charge through a phenomenon known as pseudocapacitance, well-known to those skilled in the art. Pseudocapacitance is a reversible electrochemical reaction which often occurs at or near the surface of an electrode, and whose electrochemical charge/discharge properties exhibit capacitive features, distinguishing them from the processes of conventional batteries. As an example of this phenomenon, it is well known to those skilled in the art that quinone groups bonded to a supercapacitor carbon can electrochemically transform into alcohol groups in a reversible process in an acidic aqueous electrolyte, and it is known that this reaction (pseudocapacitance) provides charge storage. Quinone-containing carbon materials useful in supercapacitors thus simultaneously exhibit two types of charge storage—one associated with its surface area (double-layer charging), and another associated with the quinone electrochemistry (pseudocapacitance).

SUMMARY OF THE INVENTION

It is an object of this invention to provide a method for improving the energy storage of carbon materials useful as electrodes in energy storage devices. This is accomplished through a unique and advantageous surface treatment for carbons to increase their charge storage through pseudocapacitance. It consists of sulfonation and preferably sulfonation preceded by hydrogenation. While not desiring to be bound, it is believed this treatment places sulfonic acid groups on the edges of graphite planes. This enhances the carbon's charge storage through pseudocapacitance; the pseudocapacitive reaction is the reversible electrochemical conversion of a sulfonic acid group to a sulfinic acid group which occurs upon charge and discharge. This sulfonic/sulfinic charge storage mechanism has particular advantages in that a) it occurs at a voltage in the middle of the useful range for aqueous systems, so that sulfonated carbon anodes and cathodes charge to a roughly equal degree when they are worked against one another, and b) sulfonation of any carbon or any other organic material is known to enhance proton transport, facilitating fast electrochemical reactions (and thus fast discharge in a charge storage device).

Sulfonation through direct reaction with concentrated sulfuric acid or fuming sulfuric acid produces desirable improvements in the performance of carbon supercapacitor materials; however, even greater improvements are observed if the carbon is first hydrogenated and then sulfonated. This two-step approach to sulfonation (hydrogenation followed by sulfonation) is an important part of the new art disclosed herein. Hydrogenation is believed to convert oxygen-containing functional groups on the carbon edge-planes to hydrogens, facilitating the subsequent substitution of sulfonic acid groups at these atomic sites.

In the broadest sense of the invention, the sulfonation procedure is applicable to any carbon material, regardless of whether the carbon exists as a porous monolith, powder, fiber, cloth, film, or in some other form. In the present invention, the sulfonation is particularly directed to a structural class of carbon known as fibrils.

Carbon Fibrils

There are many types of carbon structures that are observed on a microscopic scale, such as the crystalline platelets of graphite or the spherical shapes of fullerenes ("buckyballs"). Another structural type is a carbon fibril, which is a thin vermicular (wormlike) carbon deposit having a diameter of about 500 nanometers or less. Carbon fibrils can exist as filaments (solid-core) or tubes (hollow core), and they are frequently referred to as "nanotubes" or "nanofibers." Their internal structures vary: some consist of single- or multiple-wall graphite tubes oriented roughly parallel to the fibril axis, others have a graphitic tube core surrounded by a layer of amorphous carbon, and still others are layered solid filaments with varying layer orientations.

Typically, carbon fibrils are prepared through the catalytic decomposition of carbon-containing gases at heated metal surfaces. This is typically done in an inert atmosphere, using gases which only contain carbon and hydrogen (although some preparations introduce gases containing other elements). These preparations have been reported at a wide range of temperatures, from 400° C. to 1500° C.

The preparation and properties of carbon fibrils are described in a number of patents. Tennet U.S. Pat. No. 4,663,230, issued May 5, 1987, describes carbon fibrils which are free of an amorphous carbon coating and consist of multiple graphitic outer layers substantially parallel to the fibril axis. Tubular fibrils with graphitic layers and diameters between 3.5 and 75 nanometers are described in Tennet et al. U.S. Pat. No. 5,165,909, issued Nov. 24, 1992, Tennet et al. U.S. Pat. No. 5,171,560, issued Dec. 15, 1992, and Mandeville et al. U.S. Pat. No. 5,500,200, issued Mar. 19, 1996. For the purpose of this invention, U.S. Pat. Nos. 4,663,230; 5,165,909; 5,171,560; and 5,500,200 are incorporated herein by reference. Fibrils having different macromorphologies, such as the so-called "fishbone" morphology are described in European Patent Application No. 198,558 to J. W. Geus (published Oct. 22, 1986). Fibrils with the fishbone morphology may be characterized as having their c-axes (the axes which are perpendicular to the tangents of the curved layers of graphite) at some angle less than perpendicular to the cylindrical axes of the fibrils.

The surface chemistry of carbon fibrils will depend on their method of preparation. If the fibril is made from gases containing not only carbon, but also oxygen, sulfur, or nitrogen, the latter three elements can be incorporated into surface groups (groups bonded to the edge planes of carbon). Another surface chemistry would result from the following procedure: An existing fibril might be subjected to a high temperature treatment in an inert atmosphere (>1000° C.) to graphitize any amorphous carbon remaining in the fibril. The high graphitization temperature will cleave off surface groups and leave the carbon edge atoms (carbons at the edges of the graphene planes) with a vacant valence (i.e., without a terminating group). When the sample is cooled and removed from the graphitization furnace, these edge carbons will scavenge oxygen from the air to fill the missing valence, creating a carbon fibril with an oxygen-containing surface.

Still another surface chemistry will result from the following preparation: If the carbon fibril is synthesized from a hydrocarbon feedstock containing only carbon and hydrogen using relatively low temperatures (below approx. 800° C.), the resulting fibril is expected to contain surface hydrogen. In this case there are no elements except for hydrogen which are available to terminate the edge planes of the carbon fibrils. Furthermore, once the hydrogen becomes attached to these edge sites it should remain in place, because the temperature within the reactor is insufficient to homolytically cleave the carbon-hydrogen bond which has been formed.

Carbon Fibrils as Electrode Materials

Some carbon fibrils have proven to be useful as supercapacitor electrode materials. Some fibrils have large amounts of exposed and electrochemically active surface area, and this accessible, pore-free morphology gives them a desirable characteristic not observed in conventional supercapacitor carbons, namely significant amounts of double-layer capacitance (energy storage) at frequencies above 10 Hz. The frequency associated with a capacitance is a relative measure of the charge/discharge speed, so that higher frequency capacitance indicates higher power output for an energy storage material.

The capacitance of carbon fibrils materials can be greatly enhanced by the sulfonation procedure disclosed herein. Capacitance enhancements of up to 330% (i.e., energy storage improvements of 330%) have been observed in our laboratory when fibrils have been treated with the procedures in this disclosure. Furthermore, capacitance improvements are observed even at very high frequencies (we have made measurements at up to 1000 Hz). It is thus clear that sulfonation not only improves the fibril's energy storage properties, it also improves their power properties. The degree of improvement for any particular carbon sample will depend on its structure.

The preferred sulfonation procedure for carbon fibrils consists of a hydrogenation followed by a sulfonation. As is the case with other carbons, the hydrogenation step converts oxygen-containing surface groups to hydrogen, creating a surface site which can be more easily sulfonated. However, in those cases where the carbon fibril surface is already hydrogenated as a consequence of its method of preparation, it may not be necessary to carry out the hydrogenation step.

The objects of the present invention together with additional objects, novel features and advantages thereof over existing prior art forms, which will become apparent to those skilled in the art from detailed disclosure of the present invention as set forth herein below, are accomplished by the improvements herein described and claimed.

BRIEF DESCRIPTION OF THE INVENTION

FIG. 1 is a graph of capacitance as a function of frequency for a carbon fibril sample before and after sulfonation in accordance with Example 1 of the invention.

FIG. 2 is a graph of capacitance as a function of frequency for a carbon fibril sample after sulfonation in accordance with Example 2 of the invention.

DETAILED DESCRIPTION OF THE INVENTION

Described next is a method of treating carbon fibrils to sulfonate them and thereby increase their energy storage as electrode materials. Electrodes incorporating sulfonated carbon fibrils are desirable for use in supercapacitors.

In one embodiment of the invention, the sulfonated carbon fibrils are prepared by a method which comprises heating the carbon fibrils in an appropriate sulfonating medium at a temperature effective to cause sulfonation of said carbon fibrils. Typically, the carbon fibrils are sulfonated in the presence of fuming sulfuric acid, concentrated sulfuric acid, $SO_3$ or chlorosulfonic acid at a temperature of about 90 to 160° C. Preferably, the carbon fibrils are sulfonated in the presence of fuming sulfuric acid at a temperature of about 110 to 150° C.

In another embodiment of the invention, the carbon fibrils are preferably hydrogenated prior to sulfonation. The hydrogenation step is typically carried out in the presence of a hydrogen containing gas. Preferably, the carbon fibrils are hydrogenated in the presence of pure hydrogen at a temperature of about 400° C. up to a temperature which is about 50 degrees below the highest temperature that the carbon fibrils have previously experienced.

In a preferred embodiment of the invention, the preparative process comprises the following steps:

1) hydrogenating the carbon fibrils at a temperature greater than 400° C. but at least 50 degrees below the highest temperature that the carbon fibrils have previously experienced, preferably in a pure hydrogen atmosphere, although a mixture of hydrogen and inert gas may be used. This step may optionally be omitted if the carbon fibril surface is already hydrogenated as a consequence of its method of preparation; and 2) sulfonating the carbon fibril from Step 1, preferably by treating the fibril with fuming sulfuric acid, although concentrated sulfuric acid $SO_3$, or chlorosulfonic acid may be used. The sulfonation step is typically carried out at a temperature of about 90 to 160° C. and, preferably, at a temperature of about 110 to 150° C.

According to this invention, in order to prepare carbon electrodes with high-performance supercapacitor characteristics, it is desirable to sulfonate the carbon fibril in a two-step process in which the carbon fibrils are hydrogenated in the first step followed by sulfonation in a second step. The process disclosed herein not only gives higher capacitances, in addition, this capacitance is largely retained as one charges/discharges the carbon at increasing rates. This effect may be due to enhanced rates of proton transport in the electrolyte near the carbon surface. This phenomenon has precedent in that sulfonation is known to enhance proton transport in polymeric membranes immersed in aqueous media. Fast proton transport facilitates fast electrochemical charge/discharge reactions at the supercapacitor surface, and in turn these fast charge/discharge characteristics make the carbon a high power charge storage medium. High power is an important attribute of a supercapacitor.

Hydrogenation is typically performed by heating the carbon fibrils in an atmosphere of preferably pure hydrogen, although mixtures of hydrogen and inert gases may be used, heating to a temperature above about 400° C.(but preferably at least 50 degrees below the highest temperature that the fibril has previously experienced) at a rate of about 1 to 5° C./min, more preferably at about 1° C./min. The ramp rate in this step is not critical, as the hydrogenation reaction only occurs at elevated temperatures. The hold time at maximum temperature will depend on the amount of carbon present and the flow rate of hydrogen into the furnace; a larger amount of carbon will require more hydrogen to pass over it to obtain a complete reaction. A final temperature above 400° C. is desirable to obtain an extensive reaction with hydrogen; note however that restricting the temperature to a value below the highest temperature previously experienced by the fibril inhibits the carbon from becoming further graphitized (which may reduce its surface area) during the hydrogenation process. A reduced surface area would detract from the carbon's supercapacitor performance.

Sulfonation preferably comprises heating the hydrogenated carbon fibrils in fuming sulfuric acid (5–30% $SO_3$) at about 90 to 160° C. and, preferably at about 110 to 150° C. for 24 hours. It has been found that heating for a longer period does not dramatically improve the results. Alternative procedures include heating the carbon fibrils in either concentrated or fuming sulfuric acid at temperatures that range from room temperature to about 290° C. for periods of 1 hour to four days.

Carbon fibrils are typically made by growing the fibril onto a metallic catalyst nucleation point. The carbon fibrils synthesized in this manner often contain a residual amount of catalyst or other metal-containing residue. For the purpose of using carbon fibrils in a supercapacitor, it may be desirable to reduce or eliminate these impurities, as the presence of leachable metals or metallic ions can lead to leakage current or self-discharge in a supercapacitor device. Such impurities may be reduced or eliminated by leaching the fibrils with dilute hydrochloric acid (or through other physical/chemical means) in a step that can be performed prior to sulfonation or hydrogenation/sulfonation.

The following examples are given to illustrate embodiments of this invention.

EXAMPLE 1

A 3 gram sample of carbon fibrils obtained from Florida Atlantic University was combined with 100 cc of 6M hydrochloric acid to leach out metallic impurities; this suspension was allowed to stand overnight. It was then filtered, and the fibrils repeatedly washed with water. After air-drying, the fibrils were placed in a quartz tube furnace. A stream of hydrogen gas (100 cc/min)was passed over the sample as the furnace was ramped to 450° C. After holding at 450° C. for 2 hours, the furnace was allowed to cool to room temperature. The sample was then transferred to a flask, where 50 cc of fuming sulfuric acid (20% $SO_3$) was added, and the mixture heated to 130° C. for 24 hr, under argon. After cooling the mixture, the sample was filtered and allowed to stand in air overnight. Because the carbon powder is moist with hygroscopic sulfuric acid, it absorbs a good deal of water as it stands overnight. The next morning it is suctioned further to remove this liquid, and then an ice/water mixture is added with stirring. After filtering the ice water away, the carbon powder is washed and leached overnight in distilled water to remove traces of acid. It is then filtered and dried in air; its final weight is 3.18 g.

EXAMPLE 2

The carbon fibril starting material in this example is made from a feedstock containing only carbon and hydrogen, and thus no hydrogenation step is performed. A 2.5 g sample of carbon fibrils from Florida Atlantic University is dried under vacuum and then transferred to a flask. 50 cc of fuming sulfuric acid (20% $SO_3$) is added, and the mixture heated to 132° C. for 24 hr. under argon. After cooling, the mixture is filtered to separate the carbon, which is allowed to stand in air overnight. The next morning it is suctioned further, and then an ice/water mixture is added with stirring. After filtering the ice water away, the carbon powder is washed and leached overnight in distilled water to remove traces of acid. It is then filtered and dried in air; the weight of the dry product is 2.4 g.

In order to demonstrate that the method of the present invention will produce materials for carbon electrodes suitable for use in supercapacitors, electrochemical impedance measurements were performed. Each measurement was made on a set of two carbon electrodes, each close to 2 mils in thickness with essentially identical weights, prepared from carbon fibrils and assembled into a cell.

FIG. 1 shows a capacitance vs. frequency plot that compares carbon fibril samples before and after the treatment according to EXAMPLE 1 of this disclosure; these tests were performed in sulfuric acid electrolyte. It is seen that the capacitance (energy storage) of the treated fibrils is at least 3 times that of the original fibril, and that capacitance enhancement is observed even at the highest frequencies tested. High frequency capacitance is highly desirable since it indicates that stored energy can be delivered quickly; i.e., the higher the frequency of the capacitance, the higher the associated power delivery.

To further demonstrate that the method of the present invention will produce carbon suitable for use in supercapacitors, FIG. 2 presents the electrochemical impedance results for electrodes made from carbon fibrils treated with the sulfonation procedure described in EXAMPLE 2. Again the data was taken on a pair of 2 mil thick electrodes; the test was performed in potassium hydroxide electrolyte. A summary of the results from EXAMPLE 1 and EXAMPLE 2 is shown below.

| Carbon Material | Electrochemical Performance Results | | |
|---|---|---|---|
| | Capacitance (single electrode value) | 30 minute leakage current | Electrolyte |
| Untreated Carbon Fibril | 22 Farads/g | 35.4 uA | 6 M $H_2SO_4$ |
| Treated Fibril from | 74 Farads/g | 46.4 uA | 6 M $H_2SO_4$ |

-continued

Electrochemical Performance Results

| Carbon Material | Capacitance (single electrode value) | 30 minute leakage current | Electrolyte |
|---|---|---|---|
| EXAMPLE 1 Treated Fibril from EXAMPLE 2 | 95 Farads/g | 41.7 uA | 7 M KOH |

It is to be understood that the invention is not in any way limited to the examples described and illustrated herein and various modifications may be made without departing from the spirit and scope of the invention.

What is claimed is:

1. A method for preparing sulfonated carbon fibrils comprising the steps of:

providing carbon fibrils;

hydrogenating said carbon fibrils in a hydrogen atmosphere at a temperature of about 400° C. Up to a temperature at least 50 degrees below the highest temperature that said carbon fibrils have been previously exposed to; and sulfonating said carbon fibrils.

2. The method of claim 1 wherein said sulfonating step is conducted by heating said carbon fibrils in fuming sulfuric acid, concentrated sulfuric acid, $SO_3$, or chlorosulfonic acid.

3. The method of claim 1 wherein said sulfonating step is conducted by heating said carbon fibrils in fuming sulfuric acid at a temperature between at least 90° and 160° C. for up to 24 hours.

4. The method of claim 3 wherein said sulfonating step is carried out at a temperature of between 110° and 150° C.

5. The method of claim 3 wherein said sulfonating step is carried out for approximately 24 hours.

6. The method of claim 1 wherein said hydrogenation step is carried out in a pure hydrogen atmosphere.

7. A method for preparing sulfonated carbon fibrils comprising the steps of:

providing carbon fibrils;

hydrogenating said carbon fibrils in a hydrogen atmosphere at a temperature of about 400° C. Up to a temperature at least 50 degrees below the highest temperature that said carbon fibrils have been previously exposed to; and sulfonating said carbon fibrils by heating said carbon fibrils in concentrated or fuming sulfuric acid at a temperature between room temperature and 290° C. for a period of 1 hour to 4 days.

* * * * *